United States Patent
Wilt et al.

(10) Patent No.: US 7,411,321 B2
(45) Date of Patent: Aug. 12, 2008

(54) ELECTROMAGNETIC ENGINE

(76) Inventors: Herman Wilt, 121 Annie Mae Dr., Vidalia, GA (US) 30474; Kathrine Wilt, 121 Annie Mae Dr., Vidalia, GA (US) 30474; James E. Wiggins, 5035 Wheeler Lake Rd., Augusta, GA (US) 30909

( * ) Notice: Subject to any disclaimer, the term of this patent is extended or adjusted under 35 U.S.C. 154(b) by 0 days.

(21) Appl. No.: 11/979,428

(22) Filed: Nov. 2, 2007

(65) Prior Publication Data
US 2008/0067878 A1    Mar. 20, 2008

Related U.S. Application Data (63) Continuation-in-part of application No. 11/249,348, filed on Oct. 14, 2005, now Pat. No. 7,291,944.

(60) Provisional application No. 60/643,123, filed on Jan. 12, 2005.

(51) Int. Cl.
*H02K 33/00* (2006.01)
*H02K 16/00* (2006.01)

(52) U.S. Cl. .................. 310/36; 310/103; 310/152

(58) Field of Classification Search .............. 310/36, 310/103, 114–117, 152
See application file for complete search history.

(56) References Cited

U.S. PATENT DOCUMENTS

| | | | |
|---|---|---|---|
| 5,717,266 A * | 2/1998 | Maynard, Jr. ............... | 310/103 |
| 6,713,933 B2 | 3/2004 | Martin | |
| 2002/0097013 A1 | 7/2002 | Bedini | |
| 2003/0111921 A1 | 6/2003 | Honkura et al. | |
| 2003/0201692 A1 | 10/2003 | Chen | |
| 2003/0227362 A1 | 12/2003 | Byram | |
| 2004/0041481 A1 * | 3/2004 | Kuo ............................ | 310/152 |
| 2004/0183387 A1 * | 9/2004 | Moe ........................... | 310/152 |

* cited by examiner

*Primary Examiner*—Burton Mullins
(74) *Attorney, Agent, or Firm*—Richard C. Litman (57) ABSTRACT

An electromagnetic engine has inner and outer rotors having magnets of opposite polarity mounted thereon. Output is taken from the inner rotor, which is free to unidirectionally rotate. The outer rotor is caused to oscillate, the force of magnetic repulsion between the magnetic fields of the inner and outer rotors driving rotation of the inner rotor. The outer rotor may be held stationary by solenoids and holding gears when the inner and outer magnetic fields are closely adjacent in order to maximize the force of repulsion. The timing of the oscillation and pausing of the outer rotor may be controlled by EPROM circuitry and a timing sensor mounted on the output shaft or gear. Alternatively output is taken from the outer rotor, which is free to unidirectionally rotate while inner rotor is caused to oscillate, the magnetic forces between the inner and outer rotors driving rotation of the outer rotor.

11 Claims, 14 Drawing Sheets

ELECTROMAGNETIC ENGINE

CROSS-REFERENCE TO RELATED APPLICATION

This application is a continuation-in-part of U.S. patent application Ser. No. 11/249,348, filed Oct. 14, 2005, now U.S. Pat. No. 7,291,944 which claims the benefit of U.S. Provisional Patent Application Ser. No. 60/643,123, filed Jan. 12, 2005.

BACKGROUND OF THE INVENTION

1. Field of the Invention

The present invention relates generally to engines and, more particularly to an electromagnetic engine.

2. Description of the Related Art

Engines are well known in the art and have been used for many years to power machinery and a variety of vehicles. Many engines use fuel as a source of energy that, when combusted, drives various mechanisms in the process of outputting power. Mechanisms are concerned with kinematics of movement of elements including linkages, cams, gears, and gear trains. For example, a common application of a slider-crank mechanism is in the internal combustion engine. A slider-crank mechanism includes a stationary frame, a crank, a connecting rod, and, in the internal combustion engine, a piston. Another type of mechanism used in vehicle engines is a cam and follower. The cam rotates at a constant angular velocity, and the follower moves up and down. On the upward motion the follower is driven by the arm, and on the return motion by the action of gravity or a spring. In vehicle engines, two cams are used per cylinder to operate the intake and exhaust valves. One primary deficiency of typical engines is the efficiency of the engines. A constant and never ending need exists in the engine art to provide an engine that provides increased efficiency. As such, it would be desirable to provide an electromagnetic engine that excels in operational efficiency.

Thus, an electromagnetic engine solving the aforementioned problems is desired.

SUMMARY OF THE INVENTION

The present invention is an electromagnetic engine. The electromagnetic engine includes an output shaft, an outer magnet housing, an inner magnet housing, springs, input solenoids, magnets, holding gears, lock bearings, bearing cages, lock bearing races, lock bearings, shaft stabilizers, an inner magnet housing spacer, inner magnet brackets, output shaft gears, timing gear brackets, timing gear bearing brackets, timing gear bearings, timing gear shafts, timing gears, timing cams, timing rocker housings, rockers, timing pins, timing pin bolts, spring brackets, a base, and timing rocker roller bearings.

The electromagnetic engine operates by having the solenoids receive input power from an external electrical power source and providing output power to the output shaft. The magnets include four outer magnets and four inner magnets. The inner magnets have magnetic forces that oppose the magnetic forces of the outer magnets. Electrical power provided to the solenoids causes the solenoids to oscillate the outer magnets. Springs provide stability and assist the solenoids.

Once the electromagnetic motor has reached operating speed, it generates sufficient electrical energy to continue driving the electromagnetic motor for a period of time. Input energy can be supplied to the solenoids by an auxiliary electrical generator. However, the efficiency of the electromagnetic motor enables the output shaft to perform useful work. Useful work may be in the form a mechanical attachment to the output shaft for the purpose of driving an auxiliary mechanical device. Alternatively, an electrical generator may be attached directly to the output shaft to provide electrical output energy to other electrical devices.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an electromagnetic engine. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring now to the drawings, FIGS. 1-5 show a first embodiment of an electromagnetic engine 100. The electromagnetic engine 100 includes an output shaft 110, an outer magnet housing 112, an inner magnet housing 114, springs 116, input solenoids 118, magnets 120, holding gears 122, output shaft bearings 124, bearing cages 128, lock bearing races 130, lock bearings 132, shaft stabilizers 134, an inner magnet housing spacer 136, inner magnet brackets 138, output shaft gears 140, timing gear brackets 142, timing gear bearing brackets 144, timing gear bearings 146, timing gear shafts 148, timing gears 150, timing cams 152, timing rocker housings 154, rockers 156, timing pins 158, timing pin bolts 160, spring brackets 162, a base 164, and timing rocker roller bearings 166.

The electromagnetic engine 100 operates by having solenoids 118 receive input power from an external electrical power source and providing output power to an output shaft 110. The magnets 120 include four outer magnets and four inner magnets. The inner magnets have magnetic forces that oppose the magnetic forces of the outer magnets. Electrical power provided to solenoids 118 causes the solenoids 118 to oscillate the outer magnets. Springs 116 provide stability and assist the solenoids 118.

The electromagnetic engine 100 has a timing configuration that minimizes the input energy required to drive the output shaft 110. The timing configuration is associated with the oscillation of the outer magnets. The timing configuration includes timing gear brackets 142, timing gear bearing brackets 144, timing gear bearings 146, timing gear shafts 148, timing gears 150, timing cams 152, and timing rocker housings 154. As the opposing inner and outer magnets 120 are in proximity to each other, the initial force of repulsion is minimized by the speed at which the outer magnets are oscillated through the force field of the inner magnets.

Once the inner and outer magnets 120 directly oppose each other, the holding gears 122 momentarily hold the outer magnets stationary in order to maximize the repulsion and provide additional driving force to the inner magnets and the output shaft 110. Once the inner magnets have passed the outer magnets, the holding gears 122 release the outer magnets. The outer magnets, having now reversed direction, follow the inner magnets and provide additional repulsion and motive force to the output shaft 110. The timing configuration and the holding gears 122 minimize the input energy required to operate the solenoids 118 while maximizing the repelling forces of the opposing inner and outer magnets 120.

The electromagnetic engine 100 is placed in operation or set in motion by movement or oscillation of the outer magnet housing 112. This may be accomplished either mechanically by rotation of the outer magnet housing 112, or electrically by supplying an external source of electrical energy to operate the solenoids 118. Either method initiates rotation of the inner magnet housing 114 attached to the output shaft 110. Rotation of the inner magnet housing 114 begins as magnets 120 on the outer magnet housing 112 pass through the force field of opposing magnets 120 on the inner magnet housing 114.

The initial repulsion of opposing magnets 120 as their proximity reduces is minimized by the relative speed at which the outer magnet housing 112 is oscillated (force is equal to time exposed to the force field). When the inner and outer magnets 120 are approximately adjacent, the outer magnet housing 112 is momentarily held stationary when the timing pins 158 mesh with the holding gears 122.

This ensures that the total repelling force of opposing magnets 120 is exerted in the desired direction of rotation of the output shaft 110. In addition, by holding the outer magnet housing 112 at this point, the time exposed to the force field is increased, thereby further increasing energy delivered to the output shaft 110 by rotation of the outer magnet housing 112. The momentary holding of the outer magnet housing 112 is critical to the timing of the electromagnetic engine 100 as torque or load is placed on the output shaft 110.

The interaction of the opposing magnets 120 described above is more easily understood when considering one inner magnet 120, one outer magnet 120, and one holding gear 122. There are, however, four inner magnets and four outer magnets arranged on the inner magnet housing 112 and the outer magnet housing 114, respectively, so that each of the four outer magnets 120 is immediately adjacent to and opposing its respective inner magnet 120 when timing pin 158 engages the holding gear 122.

Energy imparted to the output shaft 110 by the repelling force of opposing magnets 120 is multiplied by four. Similarly, there are two holding gears 122 and two timing pins 158, one of each arranged on opposite ends of the output shaft 110. There is also a solenoid 118 associated with each holding gear 122. These solenoids 118 are attached to opposite sides of the outer magnet housing 112. One solenoid 118 operates to oscillate the outer magnet housing 112 in a direction opposite to the rotation of the inner magnet housing 114. This action propels the outer magnets 120 through the initial force fields of opposing inner magnets 120 to the point that the holding gear 122 associated with this solenoid 118 is engaged.

When the timing configuration releases the holding gears 122, a signal is sent to actuate the solenoid 118 on the opposite side of the outer magnet housing 112. This solenoid 118 reverses the direction of oscillation of the outer magnet housing 112 and accelerates it in the same direction of rotation as the output shaft 110 and the inner magnet housing 114. The outer magnet housing 112, traveling at a faster rate of speed than the inner magnet housing 114, places opposing inner and outer magnets 120 in close proximity and imparts additional force to rotate the output shaft 110.

This movement of the outer magnet housing 112 continues to the limit of the oscillating range where the timing pin 158 and the holding gear 122 associated with this side of the outer magnet housing 112 are engaged. The timing configuration then releases the timing pin 158 from the holding gear 122 after a predetermined holding time, sends a signal to the solenoid 118, and the cycle repeats. The springs 116 provide stability to the electromagnetic engine 100 and assist the solenoids 118. The four springs 116 are attached to each corner of the outer magnet housing 112 and are anchored to the base 164 by spring brackets 162.

Synchronization of the inner and outer magnets 120 is achieved by the timing pins 158 and holding gears 122. Each timing pin 158 is attached to a rocker 156. Each rocker 156 interfaces with its respective timing cam 152 via timing gears attached to the timing gear shafts 148 on each end of the electromagnetic engine 110. The timing gears 150 mesh with the output shaft gears 140, which are attached to the output shaft 110. This timing arrangement communicates inner magnet position to the outer magnets 120 in order to release the outer magnet housings 112 at precise times and to actuate the solenoids 118 for optimum performance. Optimum performance is realized when minimum effort or input energy is required to operate the solenoids 118.

As load or torque is placed on the output shaft 110, its rotational rate tends to decrease. The holding gear 122 arrangement is critical for continued synchronization of inner and outer magnets 120 as their relative speeds change. As the rotational rate of the output shaft 110 decreases, the outer magnet housing 112 needs to be held in order to compensate for the relative speed differential. Under loaded conditions, the firing or actuation rate of the solenoids 118 decreases. Through this mechanical actuality and precise timing, the efficiency and performance of the electromagnetic motor 100 is optimized.

Once the electromagnetic motor 100 has reached operating speed, it generates sufficient electrical energy to continue driving the electromagnetic motor 100 for a period of time.

Input energy can be supplied to the solenoids 118 by an auxiliary electrical generator. However, the efficiency of the electromagnetic motor 100 enables the output shaft 110 to perform useful work. Useful work may be in the form a mechanical attachment to the output shaft 110 for the purpose of driving an auxiliary mechanical device. Alternatively, an electrical generator may be attached directly to the output shaft 110 to provide electrical output energy to other electrical devices.

Figure 1:
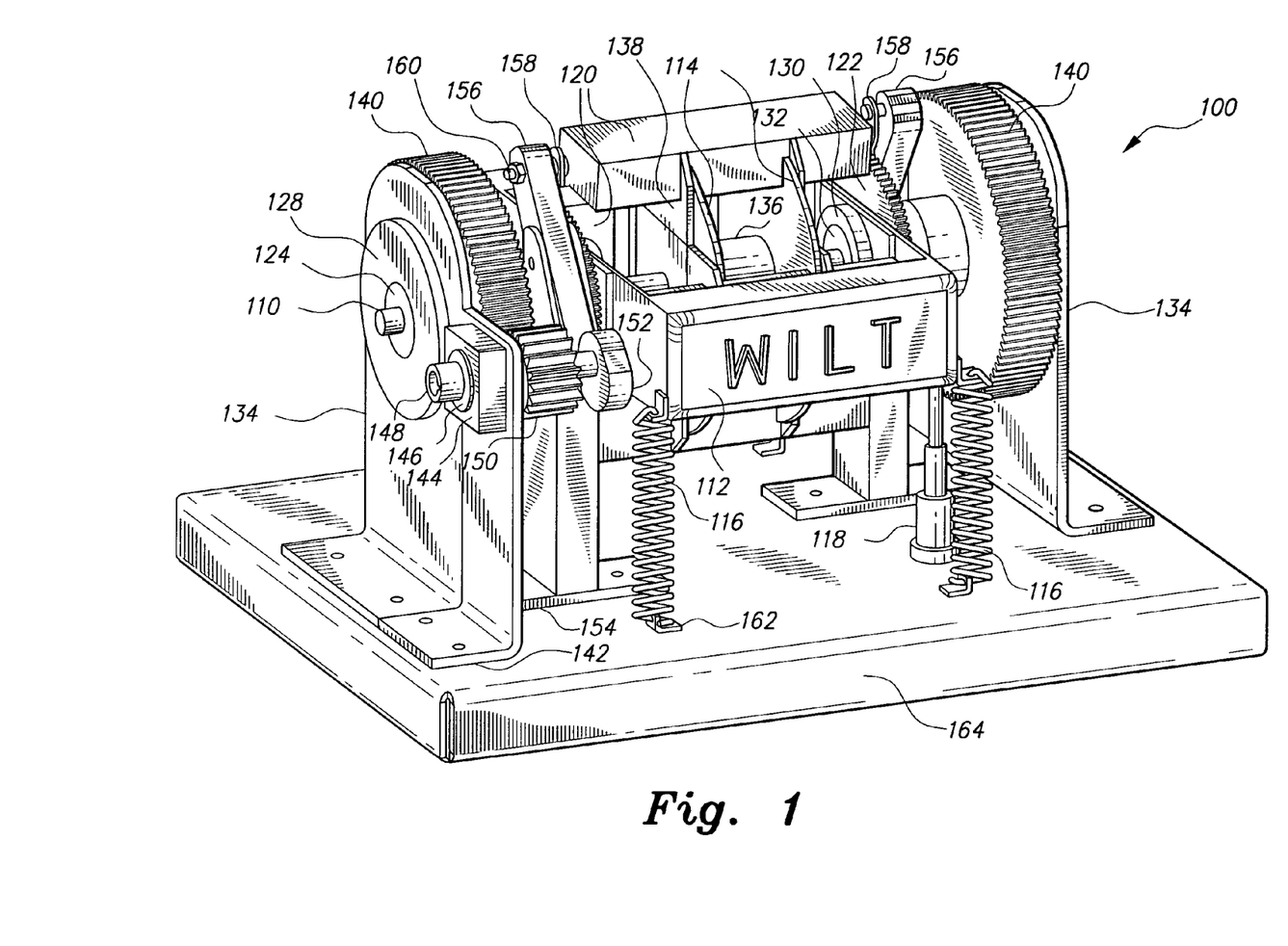
FIG. 1 is a front perspective view of an embodiment of an electromagnetic engine according to the present invention.
Figure 2:
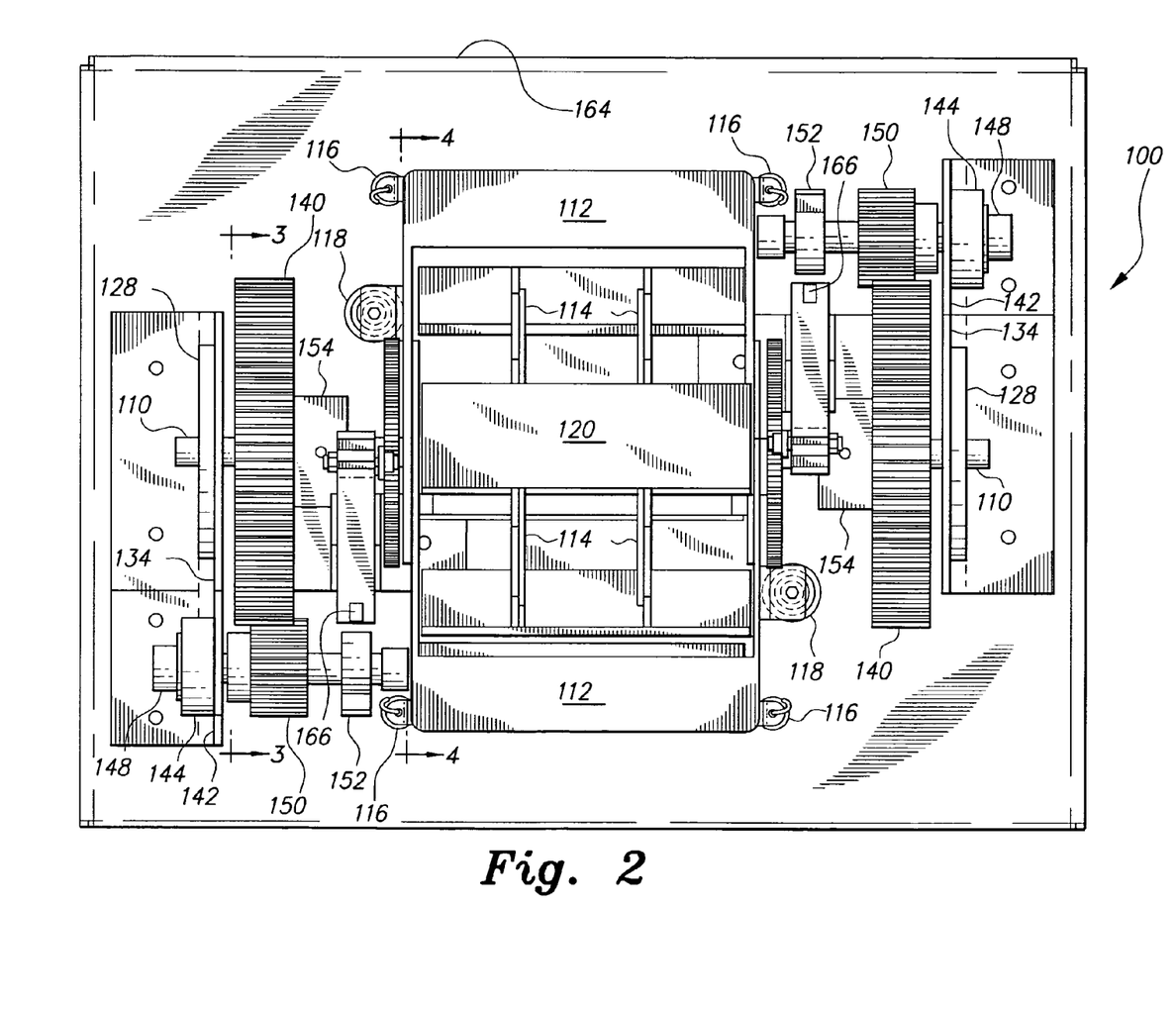
FIG. 2 is a top view of the electromagnetic engine of FIG. 1.
Figure 3:
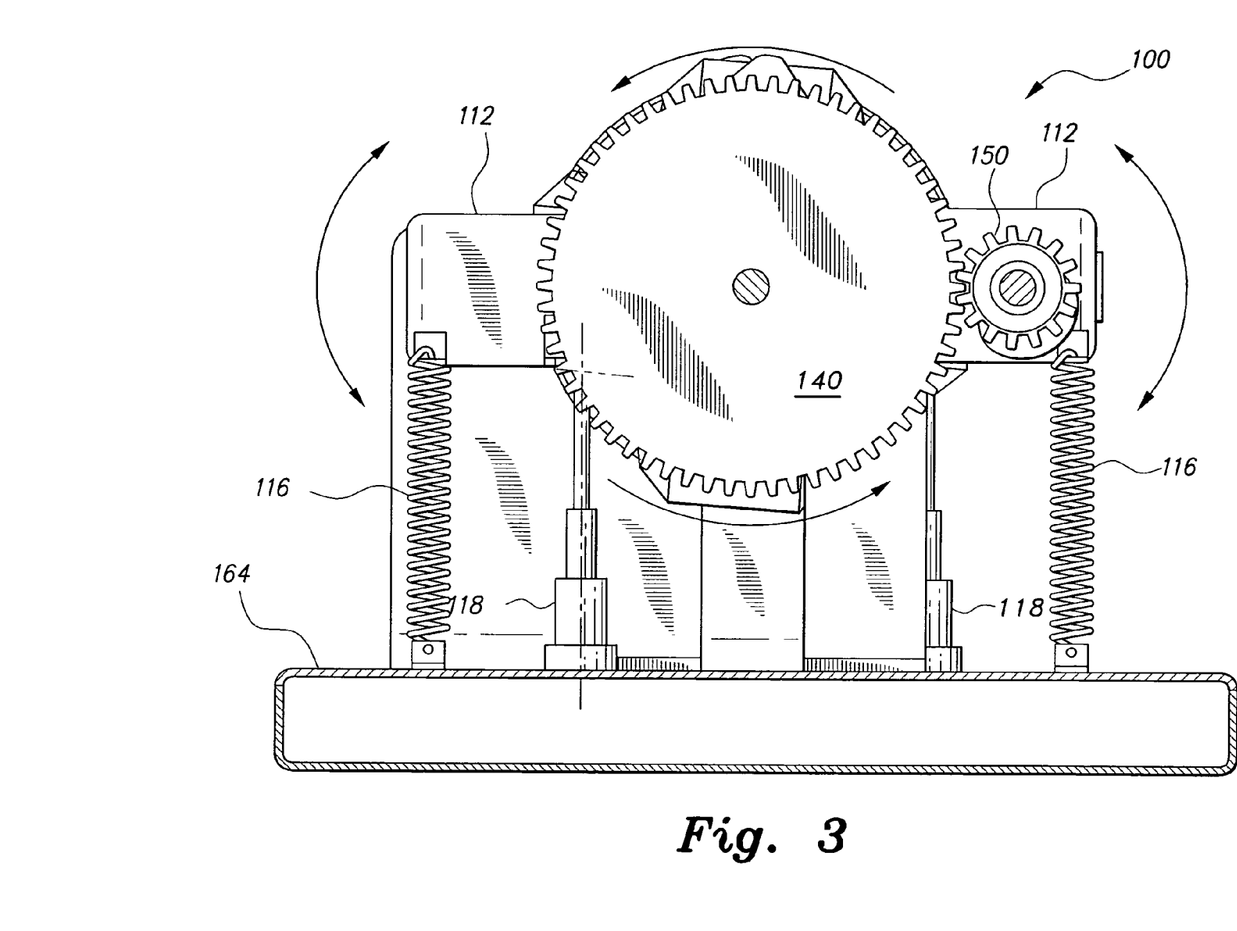
FIG. 3 is a section view along lines 3-3 of FIG. 2.
Figure 4:
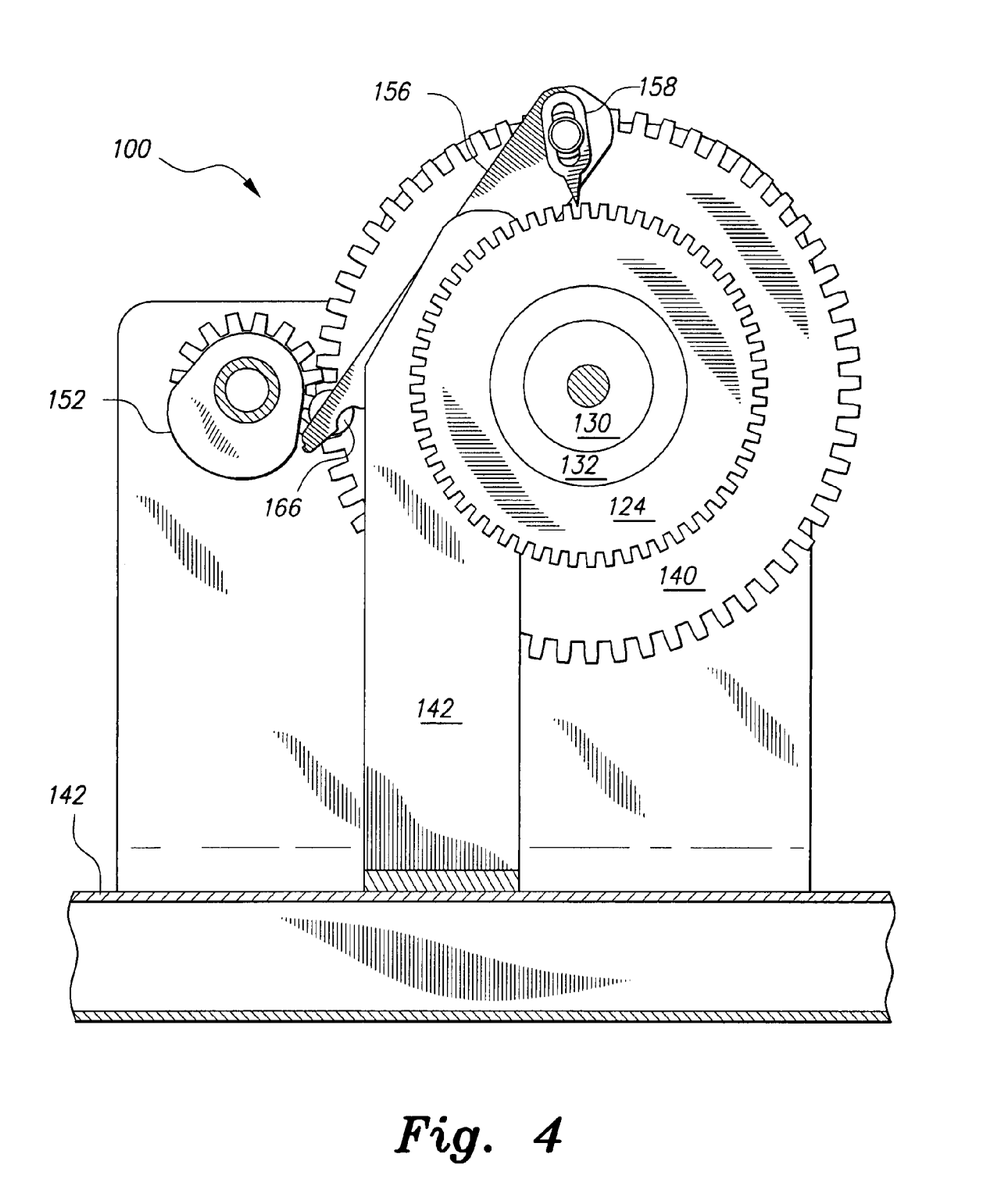
FIG. 4 is a section view along lines 4-4 of FIG. 2.
Figure 5:
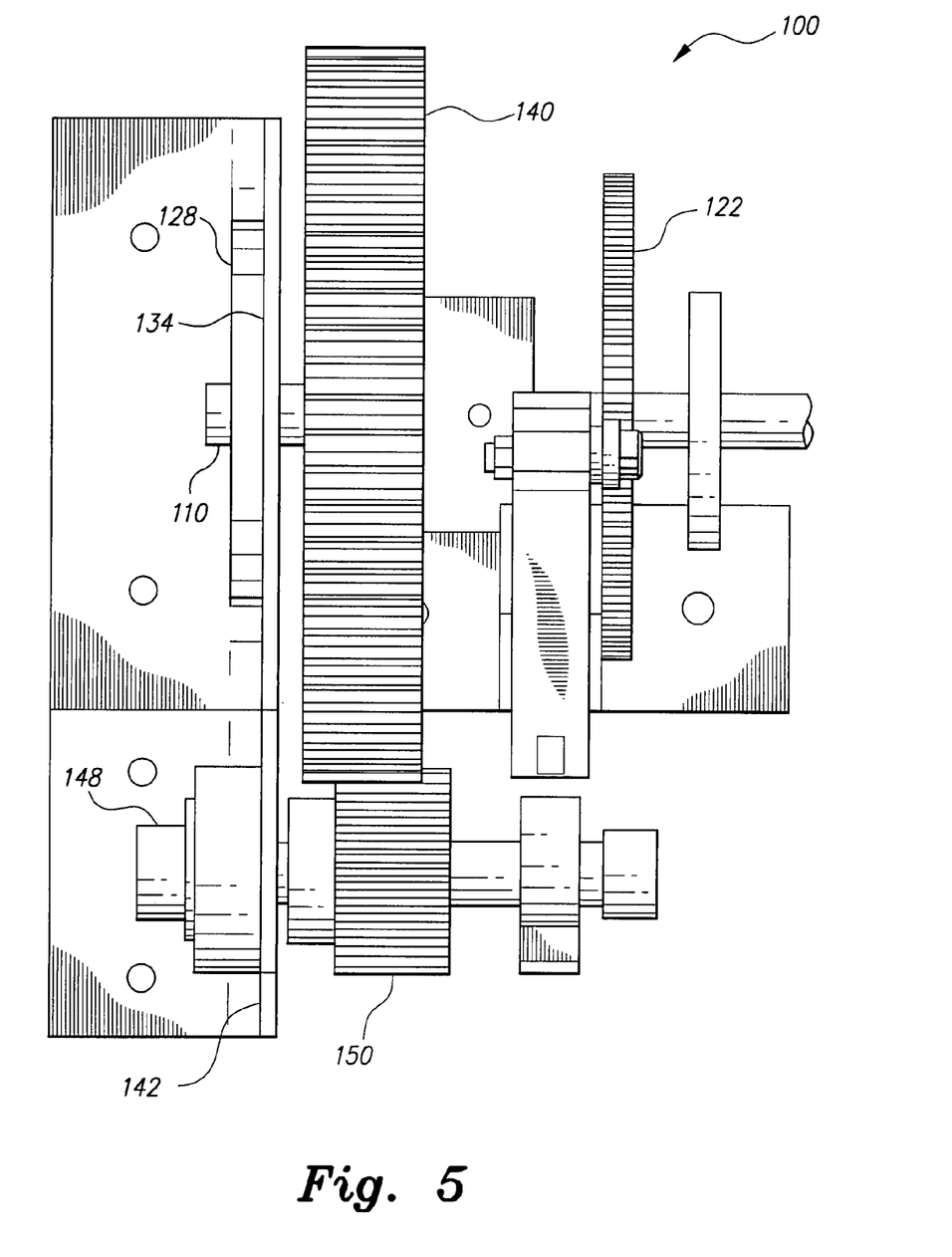
FIG. 5 is a partial top view of the left side of the electromagnetic engine shown in FIG. 1.
Figure 6:
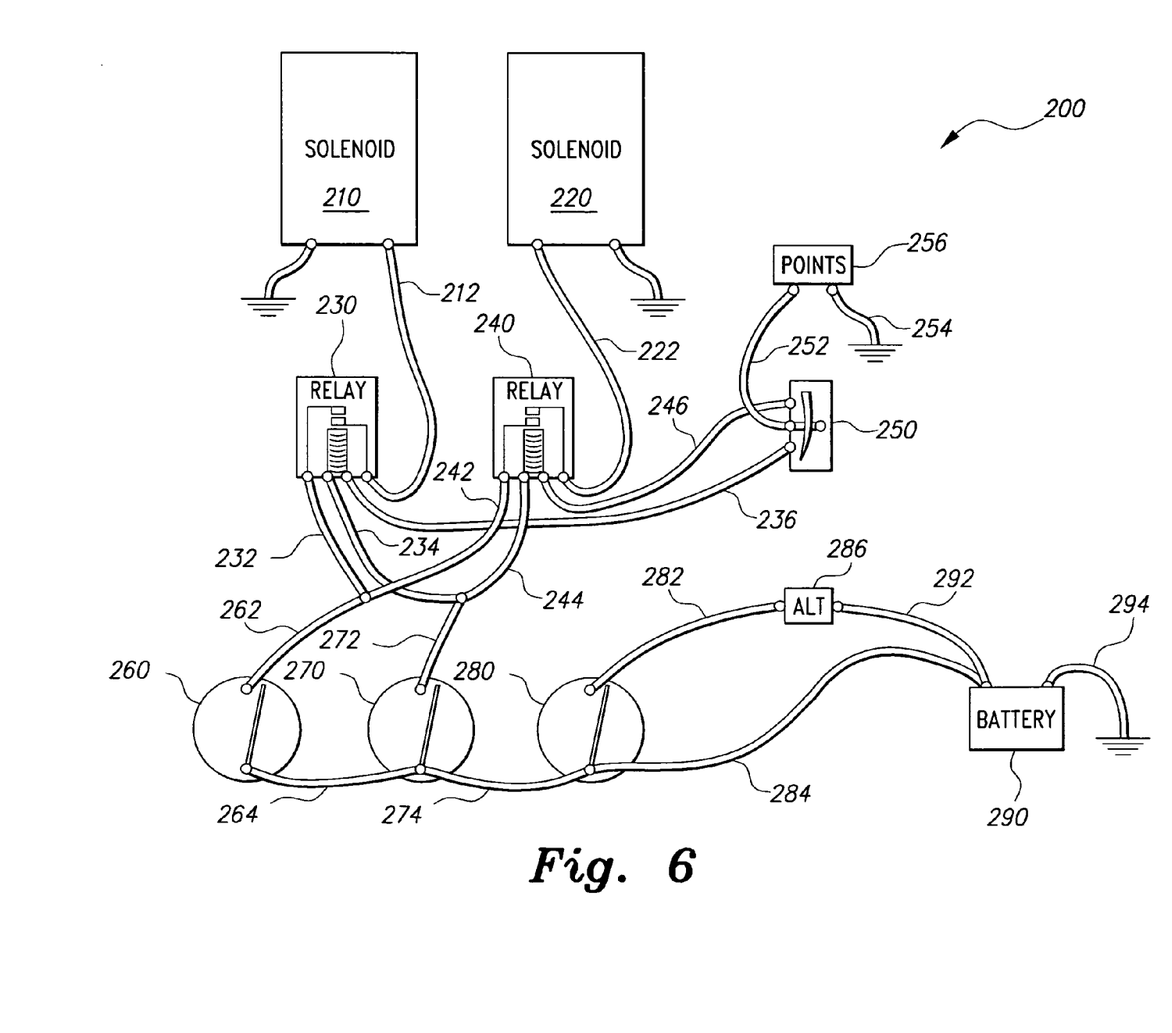
FIG. 6 is a schematic diagram of the electrical connections of the electromagnetic engine shown in FIG. 1.

A schematic diagram 200 of the electrical connections of the electromagnetic engine 100 is shown in FIG. 6. Solenoid 210 is grounded and is interconnected to relay 230 by wiring 212. Solenoid 220 is grounded and is interconnected to relay 240 by wiring 222. Relay 230 is interconnected to switch 250 by wiring 236, interconnected to switch 260 by wiring 232 and 262, and interconnected to switch 270 by wiring 234 and 272.

Relay 240 is interconnected to switch 250 by wiring 246, interconnected to switch 260 by wiring 242 and 262, and interconnected to switch 270 by wiring 244 and 272. Switch 250 is interconnected to points 256 and ground by wiring 252 and 254. Switches 260 and 270 are interconnected to switch 280 by wiring 264 and 274. Switch 280 is interconnected to alternator 286 and battery 290, and ground by wiring 282, 284, 292 and 294.

FIGS. 7-10 show another example of an electromagnetic engine 300. The electromagnetic engine 300 includes an outer rotor assembly 310 and an inner rotor assembly 305 coaxially mounted in an outer case 342 between end plates 321. The inner rotor assembly 305 is capable of 360° rotation in a single direction, while the outer rotor assembly 310 is constrained to rotate through an arc in an oscillatory movement, first in one direction, then in the opposite direction, with intervals when the outer rotor 310 is held stationary, all according to a prescribed timing pattern.

Figure 7:
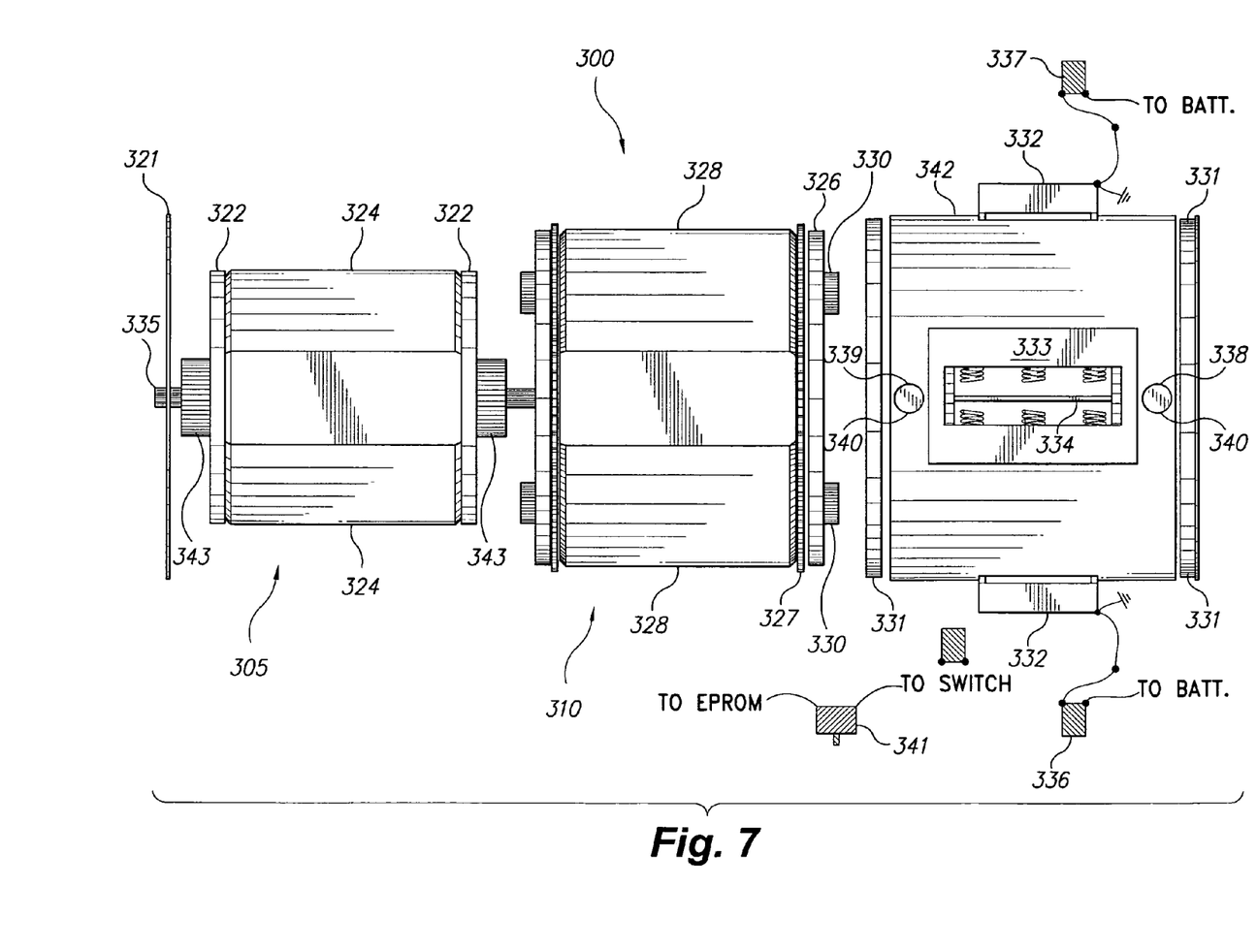
FIG. 7 is a partially exploded side view of another embodiment of an electromagnetic engine according to the present invention.
Figure 8:
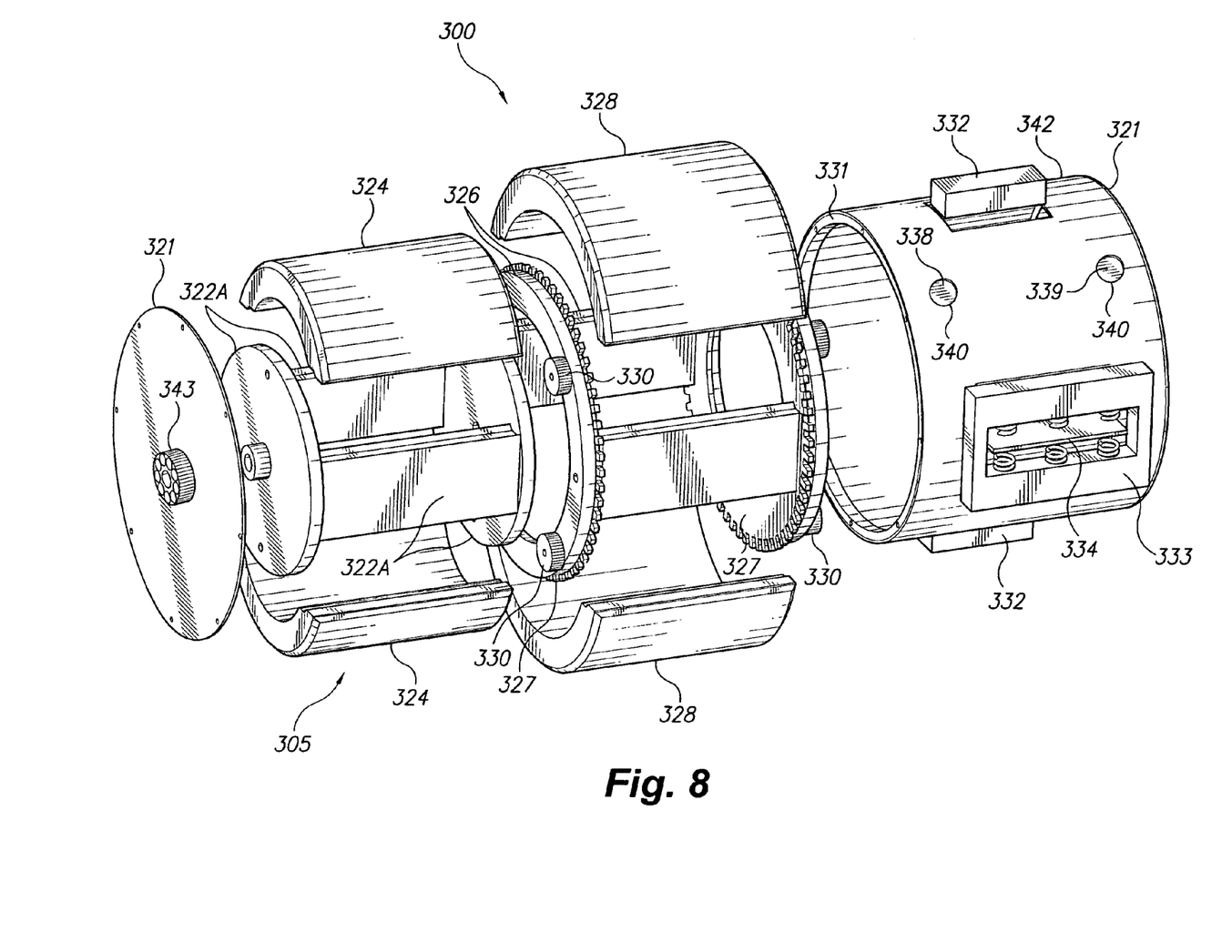
FIG. 8 is an exploded perspective view of the electromagnetic engine shown in FIG. 7.

In the embodiment of FIGS. 7-8, the inner rotor 305 includes an inner frame 322A having a pair of disk-shaped end plates connected by parallel spacer bars. A pair of arcuate magnets 324, being sections of a cylindrical shell, are mounted on the inner frame 322. An output shaft 335 is fixed to the inner frame 322 and extends through an output shaft bearing 343 mounted on end plate 321.

Figure 9:
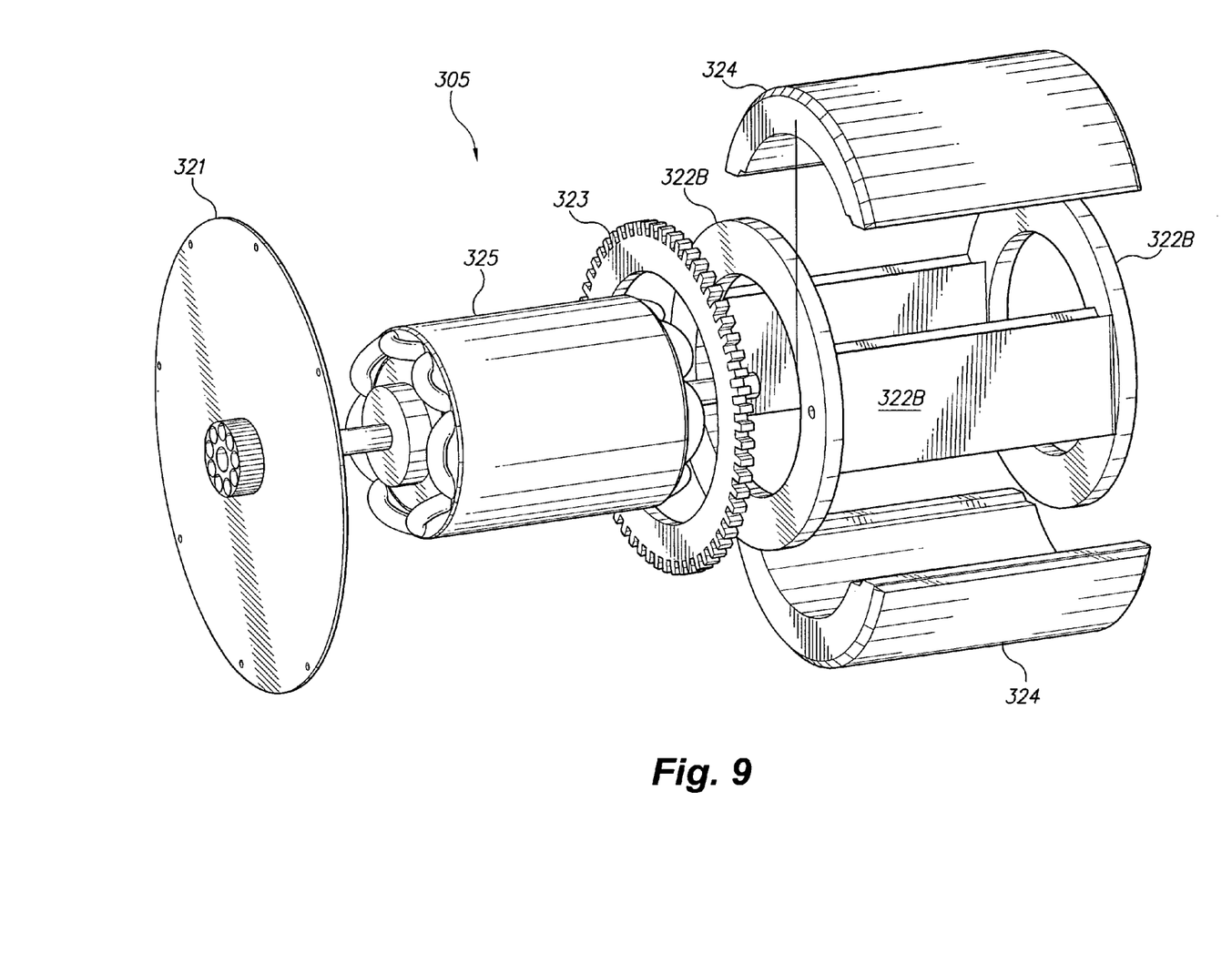
FIG. 9 is an exploded perspective view of alternative left side components of the electromagnetic engine shown in FIGS. 7 and 8.
Figure 10:
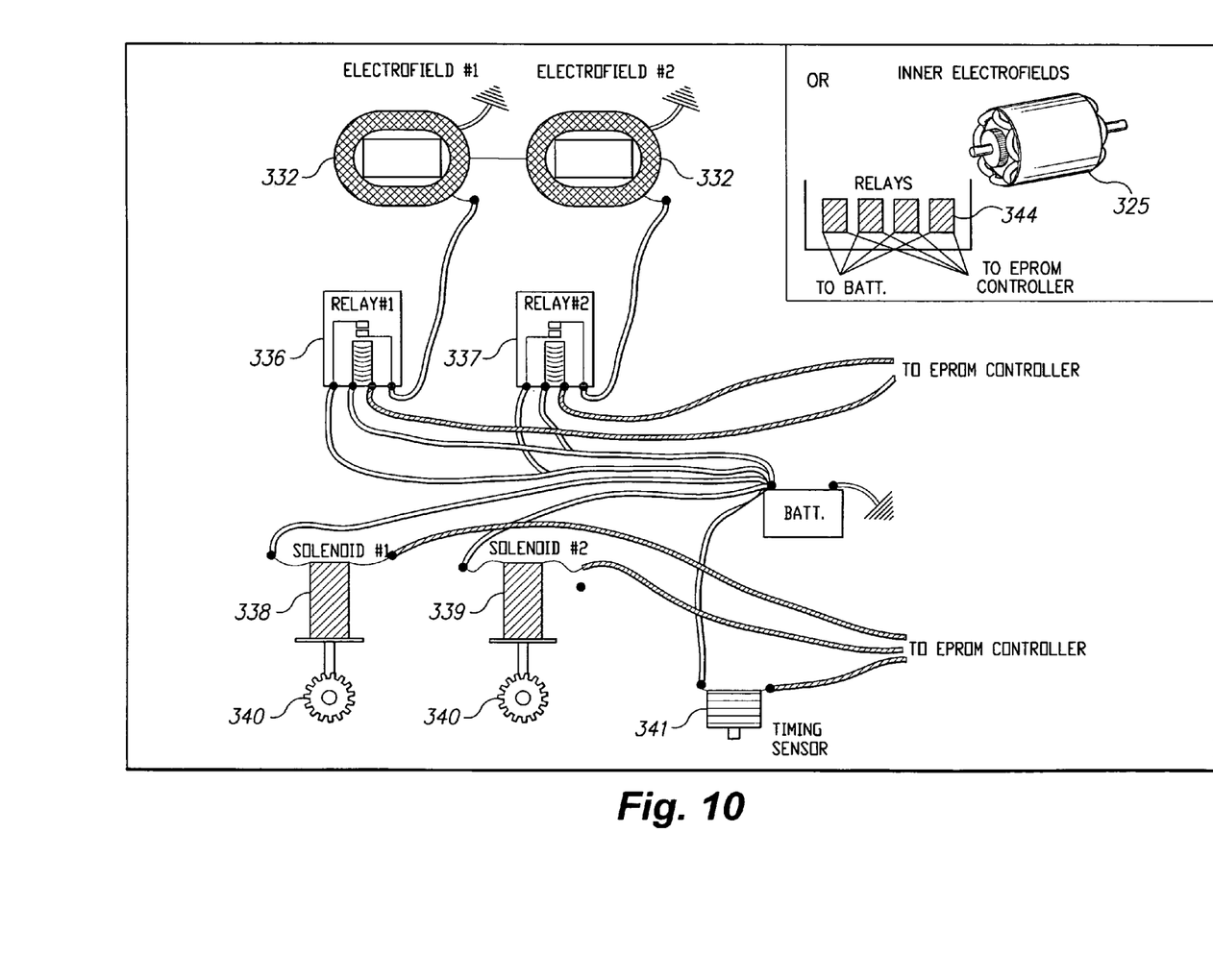
FIG. 10 is a schematic diagram of the electrical connections of the electromagnetic engine shown in FIGS. 7 and 8.

In the embodiment of FIG. 9, the inner rotor 305 includes an inner frame 322B similar in construction to inner frame 322A, but with the disk-shaped end plates replaced by rings. In this embodiment, output from the engine 300 is taken from an output gear 323 fixed to inner frame 322B. Also, in this embodiment, the inner frame rotates around inner electromagnetic field coils 325, which are held stationary within outer case 342, for a purpose described below.

The outer rotor 310 includes an outer frame 326 having a pair of end rings joined by parallel spacer bars to define a hollow annulus within which the inner rotor 305 rotates. A pair of arcuate magnets 328 are mounted on the outer frame 326, the magnets 328 being sections of a cylindrical shell. A pair of holding gears 327 are mounted on opposite ends of outer rotor 310. A plurality of bearings 330 extend from opposite ends of the outer rotor 310 and rotate within bearing races 331 defined in opposite ends of the case 342.

The magnets 328 mounted on outer frame 326 are opposite in polarity to the magnets 324 mounted on inner frame 322A or 322B. That is, if the outer faces of the magnets 328 have positive polarity and the inner faces have negative polarity, then the outer faces of inner magnets 324 have negative polarity and the inner faces have positive polarity. When the inner faces of outer magnets 328 are aligned with the outer faces of inner magnets 324 so that there is maximum alignment of the surface areas of the magnets 324 and 328, the maximum force of repulsion between the magnetic fields of the magnets 324 and 328 is developed. Either the entire shells of magnets 324 and 328 may be magnets, or bar magnets may extend axially in the central portion of the shells, being laminated to the lateral portions of the shells.

Outer case 342 is preferably made from a non-magnetic material. A first solenoid 338 and a second solenoid 339 are mounted in outer case 342 and selectively operate stop pins or pawls that engage the holding gears 327. A plurality of springs 333 (drawn as spring and cage) and spring arm 334 are provided, the springs 333 having one end attached to each corner of the outer frame 326 and the opposite end anchored at the case 342. Springs 333 stabilize oscillatory movement of outer rotor 310. A pair of outer electromagnetic field coils 332 are mounted on outer case 342, positioned 180° apart.

In the embodiments of FIGS. 7-10, the engine 300 is placed in operation (set in motion) by oscillating movement of the outer rotor 310. Oscillation of the outer rotor 310 may be initiated either mechanically in the embodiment of FIGS. 7-8, or by supplying an external source of electrical energy to operate the two outer electromagnetic field coils 332 in the embodiment of FIG. 9. This external source of electrical energy is supplied by the inner electromagnetic field coils 325, which are stationary and exist solely to place the engine 300 in operation. The inner electromagnetic field coils 325 receive their electrical energy from relays 344. Either method initiates rotation of the outer rotor 310.

Rotation of the inner rotor 305 commences as magnets 328 on the outer rotor 310 pass through the force field of the opposing magnets 324 on the inner rotor 305. The initial repulsion (due to the same polarity) of opposing magnets 324 and 328 as their proximity reduces is minimized by the relative speed (a high speed as the two magnets are moving in opposite directions) as the outer rotor 310 is oscillated. When the inner magnets 324 and outer magnets 328 are approximately adjacent, the outer rotor 310 is momentarily held stationary by the solenoid release 338 meshing with the holding gear 327. The lock bearings 340 work in conjunction with solenoid releases 338, 339 and holding gears 327.

This holding of the outer rotor 310 stationary serves multiple purposes. It ensures that the total repelling force of opposing magnets is exerted in the desired direction of rotation of the output shaft 335 or output gear 323. By "holding" the outer rotor 310 at this point, the time exposed to the force field is increased, thereby further increasing energy delivered to the output shaft 335, which is fixed to inner frame 322 and is rotatable in output shaft bearing 343 mounted in end plate 321, via rotation of the inner frame 322. Alternatively, the output may be taken from output gear 323, which is fixed to inner frame 322.

For simplicity, the above discussion of opposing magnets focused on one inner magnet 324, one outer magnet 328 and one holding gear 327. The engine 300 actually has a total of four magnets (two inner and two outer) arranged 180° apart on the inner frame 322 and the outer frame 326, respectively, so that each of the two outer magnets 328 is immediately adjacent to and opposing its respective inner magnets 324 as the solenoid release 338 engages the holding gear 327. Thus, energy imparted to the output shaft 335 by the repelling force of opposing magnets is multiplied by two. Similarly, there are two holding gears 327 and two solenoid releases 338 and 339, and two lock bearings 340, one of each arranged on opposite ends of the output shaft 335.

Additionally, there is an outer electromagnetic field coil 332 associated with each holding gear 327 and attached to opposite sides of the outer magnet frame 326. The primary outer electromagnetic field coil 332 operates to oscillate the outer magnet frame 326 in both directions, first in the same direction as the inner magnet frame 322, immediately followed by a counterrotational movement in a direction opposite to the rotation of the inner frame 322. When the outer magnet frame 326 is moving opposite the inner magnet frame 322, this action propels the outer magnets 328 through the force fields of opposing inner magnets 324 to the point that the holding gear 327 associated with the outer electromagnetic field coil 332 is engaged.

When the timing device releases the holding gear 327, a signal is also sent to actuate a secondary outer electromagnetic field coil 332 on the opposite side of the outer housing 342. The secondary outer electromagnetic field coil 332 reverses the direction of the oscillation of the outer magnet frame 326 and accelerates it in the same direction of rotation as the output shaft 335 and the inner rotor 305. The outer rotor 310, traveling at a faster rate of speed than the inner rotor 322, places opposing inner magnets 324 and outer magnets 328 in close proximity and imparts additional force to rotate the output shaft 335. This movement of the outer rotor 310 continues to the limit of the oscillating range where the solenoid release 339 and the holding gear 327 and lock bearing 40 associated with this side of the outer rotor 326 are engaged. Timing devices then release (after the appropriate holding time) the solenoid release 339 from the holding gear 327, send a signal to the outer electromagnetic field coil 332, and the cycle repeats. To provide the engine 300 stability and to assist the outer electromagnetic field coil 332, three springs 333 (drawn as spring and cage) and spring arm 334 are provided, the springs 333 having one end attached to each corner of the outer magnet frame 326 and the opposite end anchored at the case 342.

Synchronization of the inner magnets 324 and outer magnets 328 is achieved by the aforementioned solenoid release 338 and 339 and the holding gears 327. Each solenoid release 338, 339 is attached to the case 342. The solenoid releases 338 and 339 are controlled by an EPROM controller 345. Controller 345 is connected to a timing sensor 341 on the output shaft 335. The EPROM controller 345 controls activation of the relays 336 and 337 and the solenoid releases 338 and 339 at the precise time for optimum performance. Optimum performance is realized when minimum effort or input energy is required to operate the outer electromagnetic field coils 332. As load or torque is placed on the output shaft 335, its rotational rate will tend to decrease. The holding gear arrangement 327 is critical for continued synchronization of the inner magnets 324 and the outer magnets 328 as their relative speed changes. That is, as the rotational rate of the output shaft 335 decreases, the outer rotor 310 must be "held" in order to compensate for the relative speed differential. It should be noted that, under loaded conditions, the required firing (actuation) rate of the outer electromagnetic field coil 332 decreases. Through this mechanical actuality and precise timing, device efficiency and performance are thereby optimized, while the output remains the same.

Figure 11:
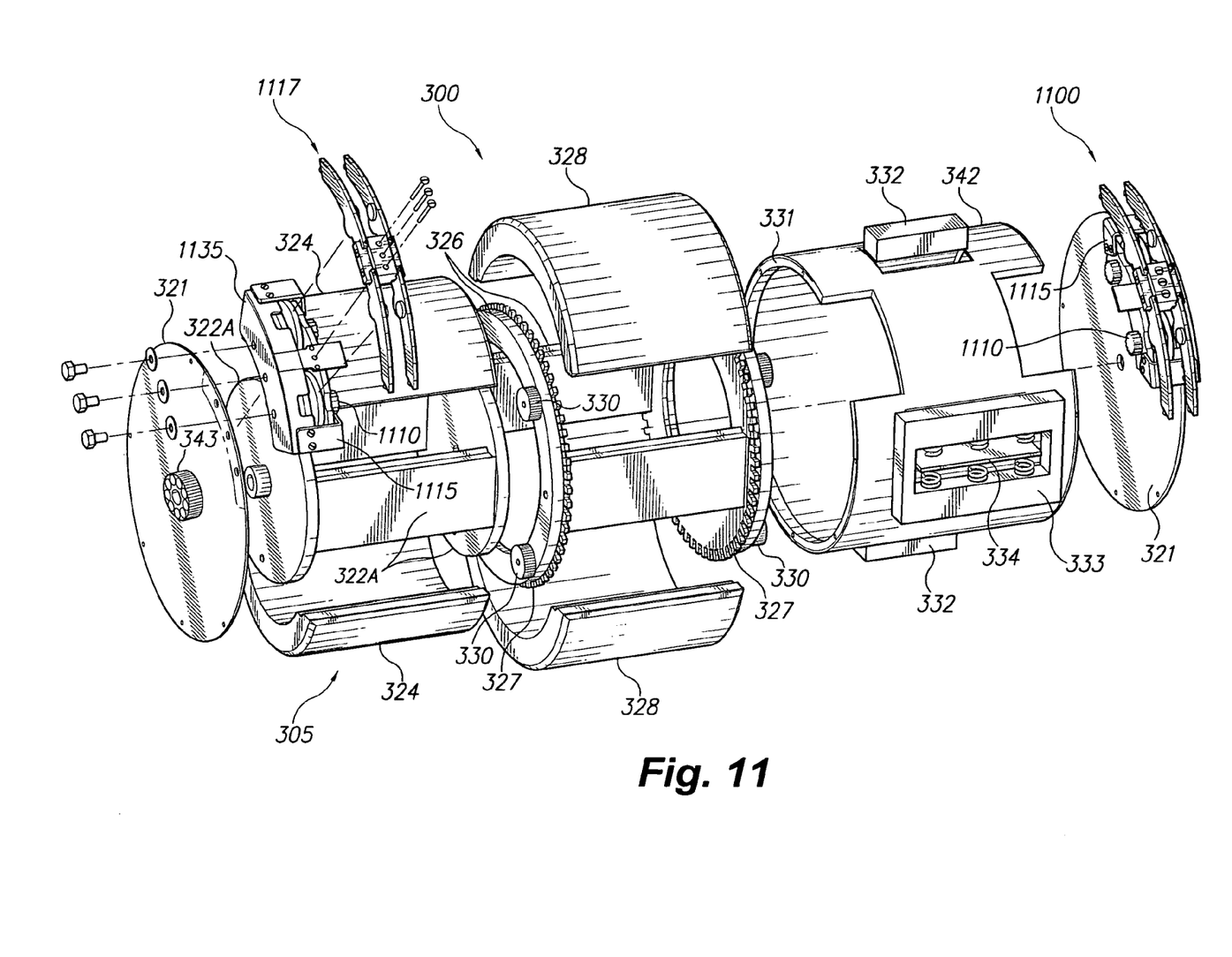
FIG. 11 is a partially exploded, perspective view of an electromagnetic engine according to the present invention similar to that shown in FIGS. 7 and 8, but having brake pads and a caliper assembly attached to the end plate.
Figure 12:
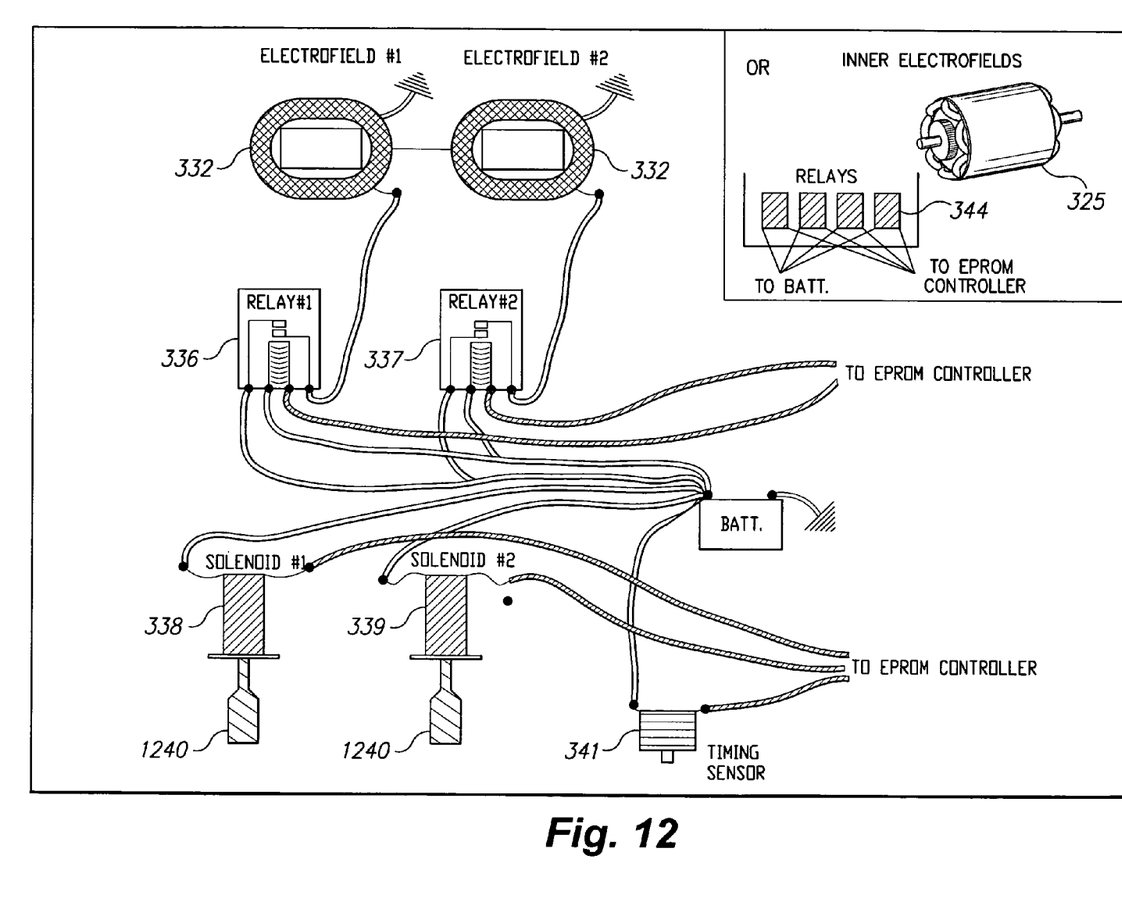
FIG. 12 is a schematic diagram of the electrical connections of the electromagnetic engine shown in FIG. 11.
Figure 13:
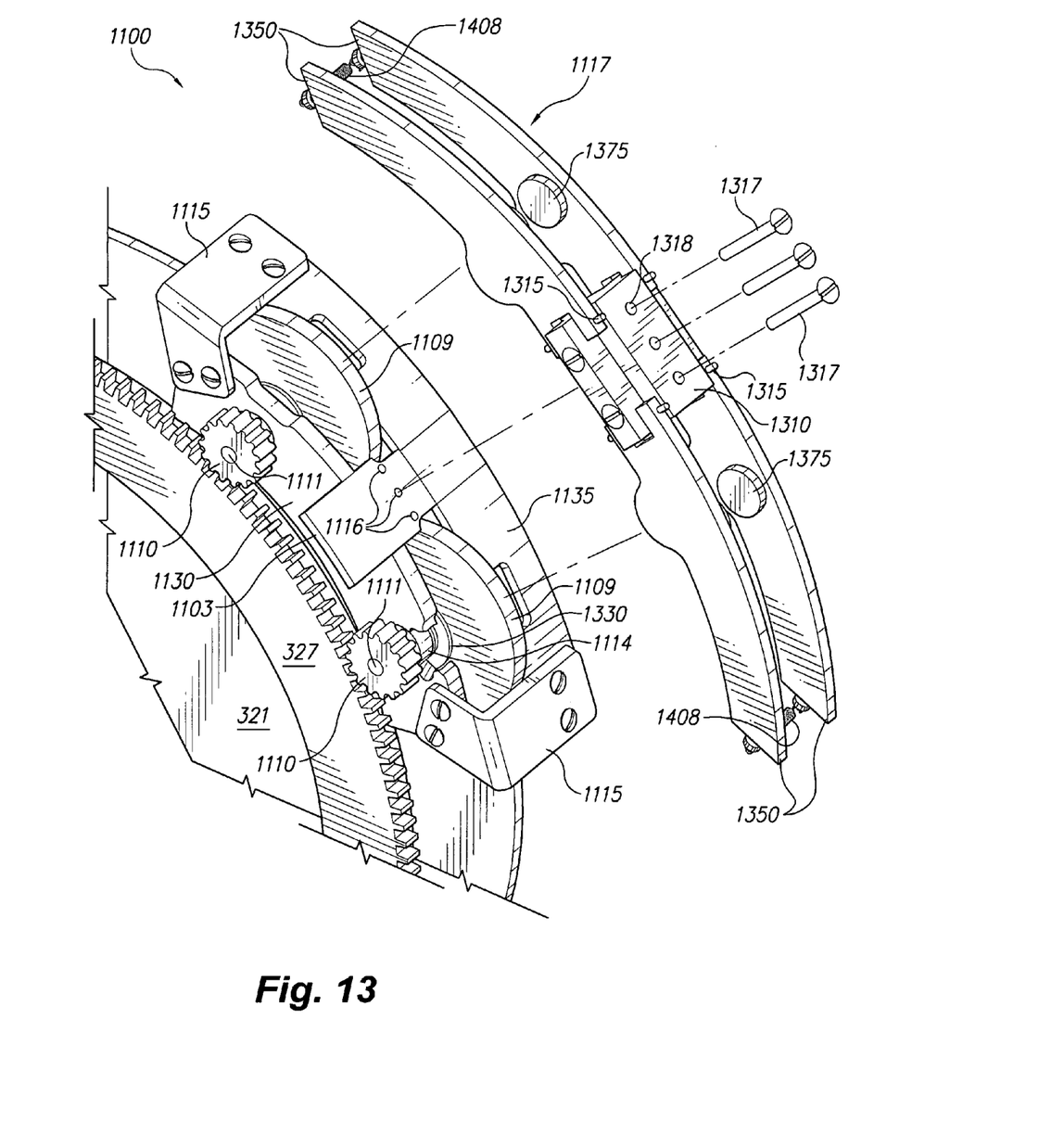
FIG. 13 is a partially exploded perspective view of the brake and caliper assembly shown in FIG. 11.

As shown in FIGS. 11-13, an alternative embodiment is provided that includes a braking assembly 1100 mounted to an end plate 321 at each end of electromagnetic motor 300. The braking assembly 1100 comprises an arcuate inner brake disk bearing plate 1130 and an arcuate outer brake disk bearing plate 1135 joined by a pair of substantially L shaped brackets 1115, to form a housing in which at least two brake rotors 1109 are freely rotatable. Each of the brake rotors 1109 has a shaft 1111. A lock bearing 1330 is mounted on the shaft 1111 proximate the brake rotor 1109. A support bearing 1114 is disposed within a wall of the inner brake disk bearing plate 1130 so that the shaft 1111 can extend through the bearing plate 1130 and be freely rotatable. For each rotor 1109, a gear 1110 is disposed at the end of shaft 1111. When the braking assembly 1100 is mounted to the end plate 321, gears 1110 mesh with holding gear 327.

A caliper mounting tang 1103 extends perpendicularly away from a middle section of the outer brake disk bearing plate 1135 while allowing space for the brake rotors 1109 to turn. Three mounting holes 1116 are disposed through the mounting tang 1103. A brake caliper/pad assembly 1117 is provided to selectively stop rotation of the brake disks 1109. The brake caliper/pad assembly 1117 is comprised of elongate arcuate caliper members 1350, which are pivotally mounted on caliper block 1310 via pivot pins 1315. Friction pads 1375 are disposed on inner surfaces of the calipers 1350. The caliper block 1310 has bores 1318 that align with mounting tang bores 1116. Fasteners 1317 can be disposed through the aligned caliper block bores 1318 and mounting tang bores 1116 to secure the caliper assembly 1117 to the mounting tang 1103, thus positioning the calipers 1350 in alignment proximate inner and outer surfaces of brake disks 1109.

Figure 14:
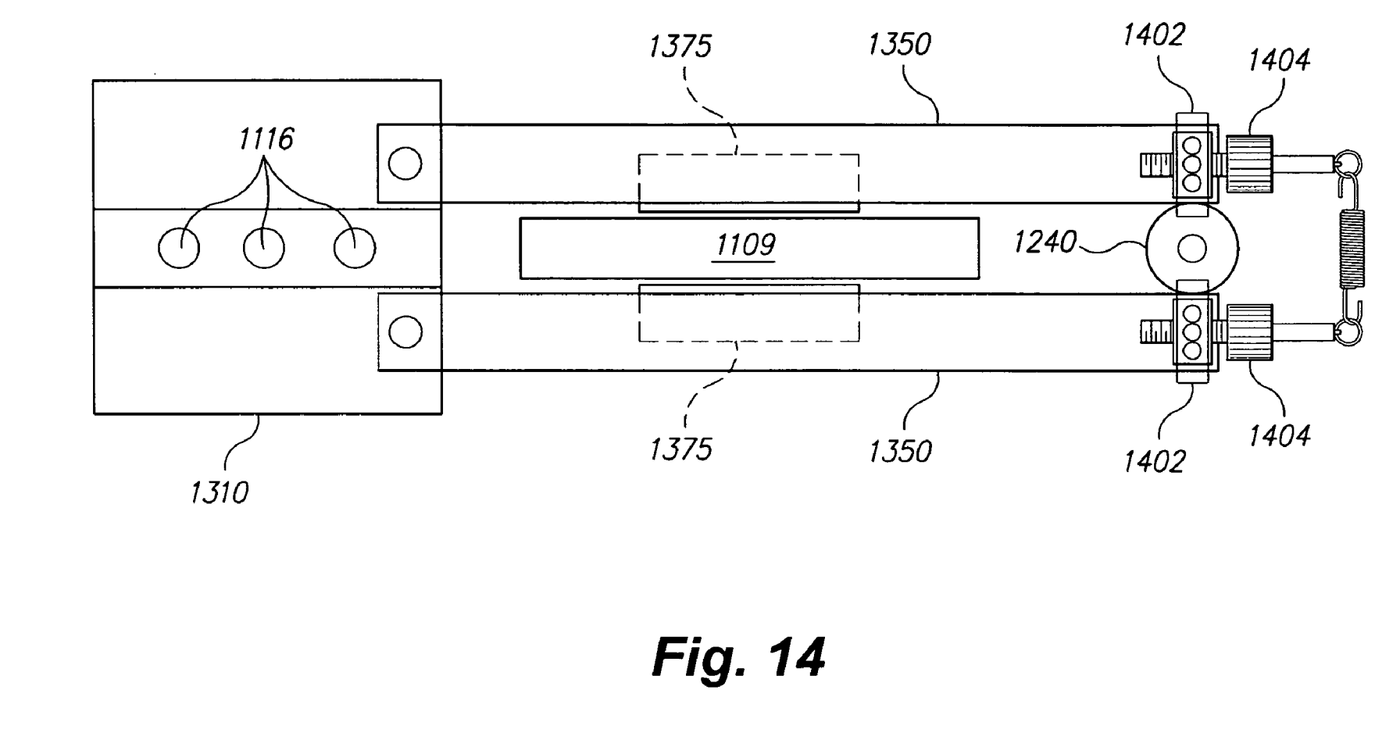
FIG. 14 is a diagrammatic partial top view of the brake and caliper assemblies of FIGS. 11-13, showing operation of the brake assemblies.

As shown in FIG. 14, caliper release bearings 1402 are retained in the calipers 1350 proximate the free ends of calipers 1350 by release bearing retainer fasteners 1404. A caliper bias spring 1408 is disposed across fasteners 1404 in order to bias the calipers 1350 to pivot towards the rotor 1109 in a braking configuration. In use, spring 1408 biases the calipers 1350 towards each other so that pads 1375 frictionally engage the rotors 1109, preventing rotation of rotors 1109. Since gears 1110 on rotor shafts 1111 engage holding gears 327, holding gears 327 are kept stationary, preventing outer rotor 310 from rotating. Upon signal from the EPROM controller, solenoid plunger 1240 extends between bearings 1402 at the ends of calipers 1350, causing the free ends of calipers 1350 to pivot away from each other, disengaging pads 1375 from rotors 1109. This permits rotation of rotors 1109 and holding gears 327, permitting the outer rotor 310 to oscillate.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example, magnetic polarities of magnets 324 supported by inner magnetic frame 322 and magnetic polarities of magnets 328 supported by outer magnet housing 326 may be reversed and/or drive configuration may be changed so that inner rotor 305 rotates in oscillating arcs to cause output rotation of the outer rotor 310.

It is to be understood that the present invention is not limited to the embodiment described above, but encompasses any and all embodiments within the scope of the following claims.

We claim:
1. An electromagnetic engine, comprising:
an outer rotor having an outer frame defining an annulus and a plurality of outer magnets mounted on the outer frame;
an inner rotor having an inner frame and a plurality of inner magnets mounted thereon, the inner frame being disposed for rotation within the annulus defined by the outer frame, the inner magnets having a magnetic field opposite in polarity to the outer magnets;
means for rotating the outer rotor in oscillating arcs;

an outer case having opposing end members, the inner rotor and the outer rotor being coaxially mounted within the outer case between the end plates;

a pair of brake assemblies, each of the end plates having a corresponding one of the brake assemblies mounted thereon;

means for actuating the brake assemblies to momentarily maintain the outer rotor in a stationary position; and an output coupling fixed to the inner rotor for rotation therewith;

wherein oscillation of the outer rotor causes rotation of the inner rotor, thereby providing output power to the output coupling.

2. The electromagnetic engine according to claim 1, wherein each of said brake assemblies comprises:

a pair of holding gears, the holding gears being mounted on opposite ends of said outer rotor;

a pair of rotor frames, each of the end members of said outer case having a corresponding one of the rotor frames attached thereto;

at least one rotor shaft pivotally mounted on each of the rotor frames, the rotor shaft having a rotor attached thereto;

a rotor gear mounted on the at least one rotor shaft, the rotor gear meshing with the holding gear;

at least one pair of substantially parallel, elongated caliper plates attached to each of the rotor frames, the caliper plates being disposed on opposite sides of the rotor, each of the caliper plates having a pivotally mounted end and an opposing free end;

a brake pad attached to each of the caliper plates, the brake pads facing the rotor;

a resilient member extending between the free ends of the at least one pair of caliper plates, the resilient member biasing the caliper plates towards each other in a braking position in which the brake pads frictionally engage opposite sides of the rotor to hold the rotor in a stationary position; and a solenoid having a release piston movable between an extended position in which the release piston is extended between the free ends of the calipers, pivoting the calipers apart to an open position in which the brake pads disengage from the rotor to permit rotation of the rotor and the holding gear, and a retracted position in which the release piston is withdrawn from between the calipers.

3. The electromagnetic engine according to claim 2, further comprising an EPROM controller circuit electrically connected to said solenoid.

4. The electromagnetic engine according to claim 3, further comprising a timing sensor mounted on said output coupling, the timing sensor being electrically connected to said EPROM controller circuit for adjusting speed of oscillation of said outer rotor according to a load attached to said output coupling.

5. The electromagnetic engine according to claim 1, wherein the means for rotating said outer rotor comprises a plurality of outer electromagnetic field coils attached to opposite sides of the outer case.

6. The electromagnetic engine according to claim 5, further comprising at least one electromagnetic field coil mounted to said outer case and disposed within said inner frame.

7. The electromagnetic engine according to claim 1, further comprising a plurality of springs having a first end anchored to said outer case and a second end attached to said outer frame, the springs stabilizing oscillation of said outer rotor.

8. The electromagnetic engine according to claim 1, wherein said output coupling comprises an output shaft fixed to the inner frame of said inner rotor.

9. The electromagnetic engine according to claim 1, wherein said output coupling comprises an output gear fixed to the inner frame of said inner rotor.

10. An electromagnetic engine, comprising:

an outer rotor having an outer frame defining an annulus and a plurality of outer magnets mounted on the outer frame, the outer rotor and frame being disposed for rotation thereof;

an inner rotor having an inner frame and a plurality of inner magnets mounted thereon, the inner frame being disposed for oscillation within the annulus defined by the outer frame, the inner magnets having a magnetic field opposite in polarity to the outer magnets;

means for rotating the inner rotor in oscillating arcs;

means for momentarily maintaining the inner rotor in a stationary position; and an output coupling fixed to the outer rotor for rotation therewith;

wherein oscillation of the inner rotor causes rotation of the outer rotor, thereby providing output power to the output coupling.

11. The electromagnetic engine according to claim 10, further comprising an outer case, said inner rotor and said outer rotor being coaxially mounted within the outer case.

* * * * *